United States Patent
Zarom

(10) Patent No.: US 8,788,589 B2
(45) Date of Patent: Jul. 22, 2014

(54) SYSTEM AND METHOD FOR COORDINATING SIMULTANEOUS EDITS OF SHARED DIGITAL DATA

(75) Inventor: Rony Zarom, New York, NY (US)

(73) Assignee: Watchitoo, Inc., New York, NY (US)

( * ) Notice: Subject to any disclaimer, the term of this patent is extended or adjusted under 35 U.S.C. 154(b) by 96 days.

(21) Appl. No.: 12/730,401

(22) Filed: Mar. 24, 2010

(65) Prior Publication Data

US 2010/0174783 A1 Jul. 8, 2010

Related U.S. Application Data

(63) Continuation-in-part of application No. 12/523,993, filed as application No. PCT/IL2008/001005 on Jul. 20, 2008.

(60) Provisional application No. 60/960,751, filed on Oct. 12, 2007.

(51) Int. Cl.
*G06F 15/16* (2006.01)

(52) U.S. Cl.
USPC .......................................... 709/205; 715/751

(58) Field of Classification Search
None
See application file for complete search history.

(56) References Cited

U.S. PATENT DOCUMENTS

| | | | |
|---|---|---|---|
| 5,008,853 A | 4/1991 | Bly et al. | |
| 5,220,657 A | 6/1993 | Bly et al. | |
| 5,515,491 A | 5/1996 | Bates et al. | |
| 5,915,091 A | 6/1999 | Ludwig et al. | |
| 6,240,414 B1 * | 5/2001 | Beizer et al. | 1/1 |
| 7,409,700 B1 | 8/2008 | Watson | |
| 7,448,061 B2 | 11/2008 | Richards et al. | |
| 7,587,695 B2 * | 9/2009 | Petunin et al. | 716/137 |
| 7,603,357 B1 * | 10/2009 | Gourdol et al. | 1/1 |
| 7,669,219 B2 | 2/2010 | Scott, III | |
| 7,769,810 B1 * | 8/2010 | Kaufman | 709/205 |
| 7,783,703 B2 | 8/2010 | Rafey et al. | |
| 7,792,158 B1 | 9/2010 | Cho et al. | |
| 7,792,788 B2 * | 9/2010 | Melmon et al. | 707/608 |
| 8,001,187 B2 | 8/2011 | Stochosky | |

(Continued)

FOREIGN PATENT DOCUMENTS

EA 12691 B1 12/2009
JP 2002-116996 4/2002

(Continued)

OTHER PUBLICATIONS

International Search Report for International Application No. PCT/IL08/01005 mailed on Feb. 4, 2009.

(Continued)

*Primary Examiner* — Ario Etienne
*Assistant Examiner* — Clayton R Williams
(74) *Attorney, Agent, or Firm* — Pearl Cohen Zedek Latzer Baratz LLP

(57) ABSTRACT

A system and method for coordinating multiple-user edits of shared digital data. A coordinating device may receive commands to edit shared digital data from multiple independently operated user computers. The coordinating device may determine that two or more of the commands from respective user computers are mutually exclusive, redundant or otherwise conflict. The coordinating device may incorporate one of the multiple commands into a global command queue and may annul the other(s). The coordinating device may transmit the global commands to all user computers to be executed locally for implemented the same shared digital data thereon.

14 Claims, 7 Drawing Sheets

(56) References Cited

U.S. PATENT DOCUMENTS

| | | |
|---|---|---|
| 8,238,376 B2 | 8/2012 | Iwamura |
| 2002/0152271 A1 | 10/2002 | Chafle et al. |
| 2004/0225988 A1 | 11/2004 | Petunin et al. |
| 2005/0004995 A1 | 1/2005 | Stochosky |
| 2005/0091289 A1 | 4/2005 | Shappell et al. |
| 2005/0235216 A1 | 10/2005 | Kawano et al. |
| 2005/0283820 A1 | 12/2005 | Richards et al. |
| 2006/0031682 A1 | 2/2006 | Sakai et al. |
| 2006/0200755 A1* | 9/2006 | Melmon et al. ............... 715/511 |
| 2006/0233203 A1 | 10/2006 | Iwamura |
| 2006/0236352 A1 | 10/2006 | Scott, III |
| 2007/0005694 A1 | 1/2007 | Popkin et al. |
| 2007/0073809 A1* | 3/2007 | Sangem et al. ............... 709/205 |
| 2007/0098297 A1* | 5/2007 | Fushiki et al. ............... 382/276 |
| 2007/0244906 A1* | 10/2007 | Colton et al. .................. 707/10 |
| 2007/0271338 A1 | 11/2007 | Anschutz |
| 2008/0072141 A1* | 3/2008 | Hodel-Widmer ............ 715/255 |
| 2008/0086494 A1 | 4/2008 | Heller et al. |
| 2008/0168526 A1 | 7/2008 | Robbin et al. |
| 2008/0183844 A1* | 7/2008 | Gavin et al. ................... 709/217 |
| 2008/0184127 A1 | 7/2008 | Rafey et al. |
| 2009/0089456 A1 | 4/2009 | Stanton |
| 2010/0138531 A1 | 6/2010 | Kashyap |

FOREIGN PATENT DOCUMENTS

| | | |
|---|---|---|
| JP | 2003271530 | 9/2003 |
| JP | 2005-236462 | 9/2005 |
| JP | 2005-258877 | 9/2005 |
| JP | 2005-294941 | 10/2005 |
| JP | 2006-050370 A | 2/2006 |
| JP | 2006-50370 | 9/2007 |
| RU | 2374681 C2 | 11/2009 |
| WO | WO 2005/008415 | 1/2005 |
| WO | WO 2006/113626 | 10/2006 |
| WO | WO 2009/047750 | 4/2009 |

OTHER PUBLICATIONS

International Search Report for International Application No. PCT/US11/29838 dated May 25, 2011.
Office Action for U.S. Appl. No. 12/523,993 dated Dec. 1, 2011.
Office Action for U.S. Appl. No. 12/523,993, mailed Apr. 19, 2012.
Japanese Office Action for Japanese Patent Application No. 2010-528522 dated Sep. 22, 2012.
Office Action for U.S. Appl. No. 12/523,993 mailed Mar. 12, 2013.
Office Action for Japanese Application No. 2010-528522 mailed May 21, 2013.
Office Action for Japanese Application No. 2010-528522, mailed Dec. 3, 2013.
Bird et al. "The Promises and Perils of Mining Git." Mining Software Repositories, 2009, MSR 2009. 6th IEEE International Working Conference on IEEE, Piscataway, NJ, USA, May 16, 2009, pp. 1-10.
Supplementary European Search Report for European Application No. EP 11 76 0238, mailed Apr. 4, 2014.
Decision on Grant for Russian Application No. 2012145121, mailed Apr. 22, 2014.

* cited by examiner

SYSTEM AND METHOD FOR COORDINATING SIMULTANEOUS EDITS OF SHARED DIGITAL DATA

CROSS-REFERENCE TO RELATED APPLICATIONS

The present application is a continuation-in-part of U.S. application Ser. No. 12/523,993, filed Jul. 21, 2009, and entitled "System and Method for Synchronized Video Sharing," which is a national phase filing of International Patent Application No. PCT/IL2008/001005, filed Jul. 20, 2008, which, in turn, claims the benefit of prior U.S. Provisional Application Ser. No. 60/960,751, filed Oct. 12, 2007, all of which are incorporated by reference herein in their entireties.

FIELD OF THE INVENTION

The present invention relates to a system and a method for digital data sharing, and in particular, to such a system and method for coordinating editing of such data by a plurality of computers over a network.

BACKGROUND OF THE INVENTION

The Internet has enabled computer users all over the world to interact and communicate electronically. For example, users can send and receive e-mail messages, view Web pages, download music, software, videos and perform many other activities.

Video data is particularly popular for transmission through the Internet. Popular video sharing Web sites such as YouTube, MetaCafe and the like enable users to upload user-created and other video content for sharing with viewers through the Internet.

Video content sharing websites are receiving increasing amounts of such video content for display. However, currently a user who wishes to view video content with another user at a remote location cannot easily have a completely shared experience. For example, if one user wishes to stop the video to examine a frame, to "rewind" (go backward in the stream) or "fast-forward" (go forward in the stream), the video content for that user may no longer be synchronized with that of the other user.

Other possible implementations for sharing data over a network, for various types of group activities, for example, for business, educational or other purposes, may include two or more parties editing data such as a movie, a text or multimedia document, one or more images, a presentation or any other digital data.

Synchronization of video data is not difficult for two devices which are in a physically similar location, as described for example in U.S. Patent Application Publication No. 2007/0136769. In that application, one video device transmits video data to another video device in order to control synchronization. Although this type of sharing has been proposed for the Internet, it is clearly inefficient, since the video data is effectively transmitted from a server to a first computer and then from the first computer to a second computer.

International Patent Application Publication No. WO 2007/079334 describes another type of synchronized system, in which a host computer is connected to a plurality of client devices. However, the client devices are described as being dedicated video players, while the host computer is described as operating media software such as the iTunes® software of Apple Computer Inc. Such a system would be suitable in a house, for example, to allow a user to broadcast media on a private network. It does not solve the problem of allowing remote users to share and synchronize editing of digital content, such as video, through a network, such as the Internet.

Currently available solutions permit a user broadcasting shared data from a single computer to control the display of the shared data on a plurality of connected computers. However, coordinating simultaneous commands from multiple users to control and edit the shared data over a plurality of computers is not possible with currently available solutions, but only through the present invention.

SUMMARY OF THE INVENTION

There is an unmet need for, and it would be highly useful to have, a system and a method for coordinating commands from a plurality of user computers on an electronic network to edit or modify the same or duplicate shared digital data.

There is also an unmet need for, and it would be highly useful to have, a system and a method for enabling sharing and editing of such digital data while controlling and synchronizing the displaying of the edited data on a plurality of computers through the network.

There is also an unmet need for, and it would be highly useful to have a system and method that enables the editorial control of digital data by all participants of a session over the electronic network.

The present invention overcomes the drawbacks of the background art by providing a system and method for coordinating simultaneous or interfering commands from multiple users to control the shared digital data through a network. Non limiting examples of such digital data may include video, audio, text or multi-media documents, games, one or more images, or presentations.

According to some embodiments, the invention is may be implemented by a web site which enables communities to share data content.

According to other embodiments, the invention may be implemented by an application which communicates over the network via peer to peer protocol.

The application, whether implemented as a web site or as a peer-to-peer application, may be handled in sessions. The members of the session may be a plurality of connected computers (e.g., connected to the web site in the web site implementation or connected to other computers in peer to peer implementation). Each session may be initiated by one of the members. For the purpose of illustration, the initiator of a session may be referred to as the "initiator". The initiator may start a session by inviting other members to join the session. During a session, members may join or leave the session. A session is preferably terminated when the initiator stops or leaves the session.

According to other embodiments of the present invention, each member of a session may share his or her digital content, for example, by placing the content in a shared place, such as a memory location, which can be accessed by all the members of the session, for example, using a uniform resource locator (URL) or other address information, or by pointing to content located on the user's own computer. In the latter case, the content may be uploaded to a server. The uploading is preferably transparent to the user.

According to some embodiments of the present invention, the session initiator may control the session or alternatively, each user may have equal control. In still another embodiment, each computer may have a predetermined control level associated with a priority level of the computer. The session initiator may delegate control of the session to one or more members of the session. Control of the session may include uploading shared digital data, edit shared digital content, play, stop, pause, rewind or fast-forward shared video content; when the content includes a document or presentation or photo album or any other multi-page or multi-layer document, control of the session may include editing the document content or to switch layers, for example, going forward, backwards or to a specific page or layer.

According to some embodiments of the present invention, whenever one of the controllers performs one of these commands, the command may be transferred to all the other members of the session using, for example, HTTP protocol (for a web site implementation) or a peer-to-peer protocol (for a peer to peer implementation). The command may cause the video/audio/text content to be simultaneously or uniformly altered in all the computers of the members of the session. It should be understood that these commands are given as examples only, and other commands may be also provided by the system and method of the present invention.

According to other embodiments of the present invention, data content may be stored in one or more content service devices. The current played content may be transmitted from the content service device to all the computers that participate in the session. The content may be rendered on each computer by an application such as a text editor or a video or media player. Controlling command(s) may be transmitted from the application of one of the computers who participate in the session to a coordinating device, such as a server. The coordinating device may first determine if there are any conflicting command(s) pending from other controlling computers and, if not, the server may transmit the verified command(s) to the corresponding application in the other computers.

According to other embodiments of the present invention, when multiple computers enter respective commands to edit the content of the shared digital data, a coordinating device, e.g., an application, computer, or server, may coordinate those commands. When the respective commands trigger edits or operations that are contradictory, redundant or mutually exclusive to modify the same or overlapping content of the shared digital data, the coordinating device may select one of the commands to execute and may annul or delete the other command(s) to prevent the execution of conflicting or interfering edits or operations.

According to other embodiments of the present invention, the participants of the session may communicate during the session via chat, video/audio conferencing, voice over Internet protocol (IP) or any other communication over a network. The communication network may be the same or different as the network over which the digital data is shared. In one example, the communication network may be a telephone network, while the network for sharing digital data may be a computer network, such as the Internet. In another example, both networks may be the Internet.

Unless otherwise defined, all technical and scientific terms used herein have the same meaning as commonly understood by one of ordinary skill in the art to which this invention belongs. The materials, methods, and examples provided herein are illustrative only and are not intended to be limiting.

Implementation of the method and system of the present invention may include performing or completing certain selected tasks or stages manually, automatically, or a combination thereof. Moreover, according to actual instrumentation and equipment of preferred embodiments of the method and system of the present invention, several selected stages may be implemented by hardware or by software on any operating system of any firmware or a combination thereof. For example, as hardware, selected stages of the invention may be implemented as a chip or a circuit. As software, selected stages of the invention may be implemented as a plurality of software instructions being executed by a computer using any suitable operating system. In any case, selected stages of the method and system of the invention may be described as being performed by a data processor, such as a computing platform for executing a plurality of instructions.

Although the present invention is described with regard to a "computer" on a "computer network", it should be noted that optionally any device featuring a data processor and/or the ability to execute one or more instructions may be described as a computer, including but not limited to a personal computer (PC), a server, a minicomputer, a cellular telephone, a smart phone, a smart mobile telephone, a personal data assistant (PDA), a pager, television (TV) decoder, game console, digital music player, automated teller machine (ATM) or other machine for dispensing cash, point of sale (POS) credit card terminal or an electronic cash register. Any two or more of such devices in communication with each other, and/or any computer in communication with any other computer may optionally comprise a "computer network".

Whenever the present invention is described with regard to digital data, it should be noted that digital data may include, but is not limited to music, slide shows, documents, images, video data, text data and documents, games, or any multimedia data.

Hereinafter "online" refers to communication performed through an electronic communication medium, including but not limited to, data transmission through the public switched telephone network (PSTN), cellular telephones or a combination thereof; exchanging information through Web pages according to HyperText Transfer Protocol (HTTP) or any other protocol for communication with and through mark-up language documents; exchanging messages through electronic mail (e-mail), messaging services such as ICQ™ for example, and any other type of messaging service; transmitting video data over any type of network; any type of communication using a computational device as previously defined; as well as any other type of communication which incorporates an electronic medium for transmission.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF THE INVENTION

Figure 1:
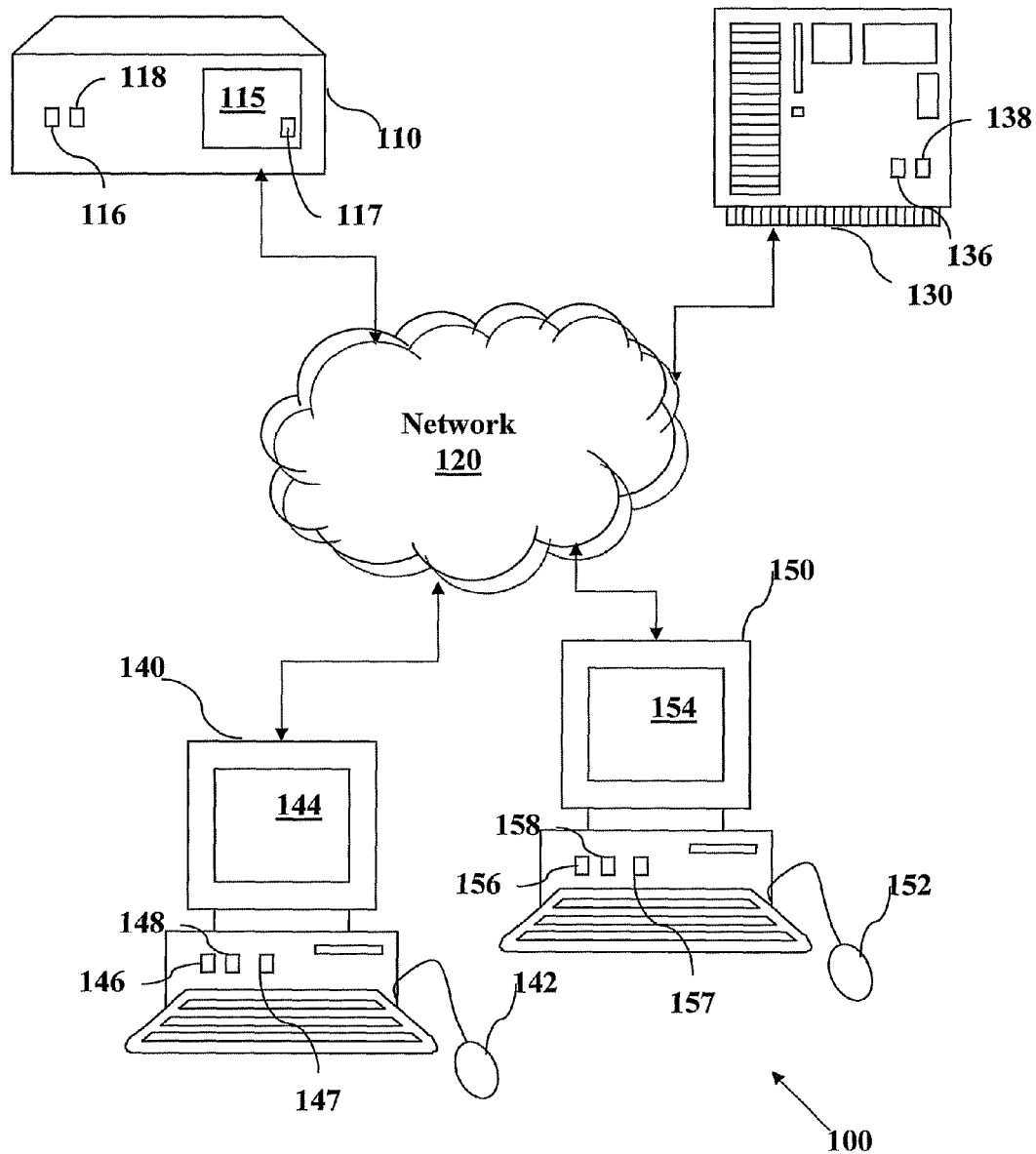
FIG. 1 is a schematic illustration of a system for controlling shared digital data over a plurality of independently operated computers according to an embodiment of the present invention.

Embodiments of the present invention provide a system and method for coordinating edits of a shared digital data document by multiple, independently operated user computers. The coordination may be executed in a coordinating device to which the multiple computers are operatively connected, such as a remote server or one of the multiple user computers, e.g., a highest priority or initiator computer. The coordinating device may connect to the multiple computers, e.g., via a network, and may act as a pipeline or funnel to merge, queue, order and prioritize the influx of commands to create a single coherent chain of commands shared by all the computers to modify the shared digital data in unison.

In some embodiments, each local document on each connected computer may be modified locally before the modifications are transmitted to the central coordinating device for implementation in the global version of the shared document. For example, a user may make changes locally on a computer and may submit changes, individually or together as a group of two or more changes, to the coordinating device. For each user, the changes generated thereby that are globally implemented in the coordinating device may remain, and the changes that are rejected may be deleted, e.g., automatically, on the local version of the shared digital data on the user's computer. In some embodiments, a list or indication of the commands that are accepted and/or rejected may be sent to each user computer.

The coordinating device may transmit the single coherent global chain of commands to all computers sharing the digital data. Each of the multiple computers may then implement the global chain of commands locally on the version of the document stored or streamed thereon. Accordingly, each document on each connected computer may be modified in substantially the same and synchronized manner, e.g., by the same global chain of commands.

In some embodiments, all computers may be given equal priority to control the shared digital data. In other embodiments, there may be a hierarchy of priority in which some computers have greater control than others. For example, if the coordinating device receives two contradictory commands from separate computers simultaneously or within a predetermined time interval, the central coordinating device may execute the command received from the computer with relatively higher priority and may discard the command received from the computer with relatively lower priority.

The shared digital data may be displayed on each user computer using standard or specific-purpose display software, such as, for example, a text editor for text documents, a photo editor for image documents, and/or a media player for video files. The shared digital data may be provided by a digital data provider, such as an Internet, media or data server.

Other types of sensory or digital data which may optionally be edited and displayed in a synchronized manner according to other embodiments of the present invention may include, but are not limited to, image data, music or other audio data, text files, and the like. Image data may optionally include for example photographs, such as an on-line photograph album.

The principles and operation of the present invention may be better understood with reference to the drawings and the accompanying description. It should be noted that the Figures below show an embodiment of the present invention with regard to coordinating control commands of shared digital data from multiple user computers for the purpose of description only and without any intention of being limiting in any way.

Referring now to the drawings, FIG. 1 shows a schematic illustration of a system for controlling shared digital data over a plurality of independently operated computers, according to an embodiment of the present invention.

System 100 may include a coordinating device 110, a plurality of computers 140 and 150, and a digital data server 130, all of which are connected via a network 120, such as the Internet. It should be understood that only two computers 140 and 150 are shown in FIG. 1 for the purpose of illustration only and that the system and method described herein is capable of handling more computers.

User computers 140 and 150 may be personal computers, desktop computers, mobile computers, laptop computers, and notebook computers or any other suitable device such as a cellular telephone, personal digital assistant (PDA), video game console, etc., and may include wired or wireless connections or modems. User computers 140 and 150 may include one or more input devices 142 and 152, respectively, for receiving input or commands from a user (e.g., via a pointing device, click-wheel or mouse, keys, touch screen, recorder/microphone, or other input components). User computers 140 and 150 may include one or more output devices 144 and 154, respectively, (e.g., a monitor, display, or screen) for displaying a shared document to respective users.

Digital data server 130 may include a computer or computer system capable of hosting shared digital data. The shared digital data may be stored on digital data server 130, for example, in the form of web pages, text documents or files, multimedia documents or files, images, video files or movies and/or games. The shared digital data may be transmitted to each user computer 140 and 150, for example, once at the beginning of an editing session, one time for each editing session, or iteratively throughout an editing session each time one or more global commands are implemented therein.

Network 120, which connects coordinating device 110, digital data server 130 and user computers 140 and 150, may be any private or publicly accessible network, such as the Internet. Access to network 120 may be through wire line, terrestrial wireless, satellite or other systems well known in the art.

Coordinating device 110, digital data server 130 and user computers 140 and 150 may include one or more controller(s) or processor(s) 116, 136, 146 and 156, respectively, for executing operations and may include one or more memory unit(s) 118, 138, 148 and 158, respectively, for storing data and/or instructions (e.g., software) executable by a processor. Processor(s) 116, 136, 146 and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 138, 148 and/or 158 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Shared digital data may be stored locally in computers 140 and 150, for example, in their respective memory units 148 and 158, and optionally may also be stored remotely in coordinating device 110 or in digital data server 130, in their respective memory units 118 and 138. The shared digital data may include, for example, web pages, text documents, multimedia documents, images, movies and/or games. Each set of shared digital data may be a document or file composed of one or more pages, as is commonly known in the art. The shared digital data may be provided to computers 140 and 150 by coordinating device 130 or digital data server 130, which may include, for example, a world wide web ("web") host, a documents or multimedia server, a gaming network or server, etc., via network 120. Alternatively, the digital data may be provided by one of computers 140 and 150 and transmitted to the other computer(s) in a peer to peer protocol connection over network 120.

The plurality of computers 140 and 150 may be independently operable computers, e.g., each controlled by respective user. Computers 140 and 150 may independently modify shared digital data. Coordinating device 110 may receive commands form the plurality of computers 140 and 150, and may store all commands received in memory unit 118.

Coordinating device 110 may coordinate the commands received from the plurality of user computers 140 and 150 to enable shared editing of the same or overlapping digital data. Coordinating device 110 may include a computing module 115, for example, having logic software, to determine which of the received command(s) to execute, which to delete, and the order of execution, according to embodiments disclosed herein. Coordinating device 110 may store a set of global commands to be executed, e.g., in an execution buffer 117. The set of global commands may be transmitted to all connected computer 140 and 150 and may be locally executed in all versions of the shared document stored thereon. Computing module 115 may be integral to or separate from processor 116 in coordinating device 110, processor 136 in shared digital data server 130, and/or processor(s) 146 and/or 156 in user computers 140 and 150, respectively. Execution buffer 117 may be integral to or separate from memory unit 118.

In some embodiments, two or more users on separate computers 140 and 150 may enter respective commands to edit the content of the same or duplicate digital data in a manner that is contradictory, redundant, or mutually exclusive. In one example, when the same or duplicate text, image or multimedia document is displayed on computers 140 and 150, the user on computer 140 may select a command to delete a paragraph, while the user on computer 150 may select a command to amend a sentence within the same paragraph. In another example, when a synchronized video is being played on multiple computers 140 and 150, the user on computer 140 may select a fast-forward command, while the user on computer 150 may select a rewind command. The respective commands to modify shared digital data from computers 140 and 150 may be mutually exclusive, and coordinating device 110 may coordinate, for example, which of the respective command(s) is to be executed or annulled and the order in which the command(s) are to be executed.

Computing module 115 may accept commands from computers 140 and 150, e.g., stored in memory unit 118, and may determine when respective commands therefrom are mutually exclusive. In one example, commands from computers 140 and 150 may be mutually exclusive when they modify the same or overlapping document content, e.g., in a text document, the same letter, word, sentence, paragraph, page or entire document, or in an image document, the same one or more pixel(s), one of a plurality of predetermined image sub-regions, quadrant, layer in a multi-layer document, image object, tag or marker, window, frame in a multi frame image stream or movie, etc. In another example, commands from computers 140 and 150 may be mutually exclusive when the commands modify the shared digital data in a contradictory manner, for example, to fast-forward and to rewind the same video data, or to make different or conflicting amendments to the same content in a text or image document. In another example, commands from computers 140 and 150 may be mutually exclusive when the commands are transmitted by computers 140 and 150 or received at coordinating device 110 simultaneously, at overlapping time(s), or within a predefined "lock-out" time period, lag, or delay.

In one example, respective commands from computers 140 and 150 that are coherent or not mutually exclusive may be merged and queued by coordinating device 110 and executed globally, in turn, in the shared digital data. The respective commands may be coherent when they edit different or non-overlapping content, when they edit the same or overlapping content but relate to different types of edits such as a text amendment and a format change, or when they are transmitted by computers 140 and 150 or received at coordinating device 110 at substantially different or non-overlapping times, e.g., after the lapse of a predefined "lock-out" time period, lag, or delay. Module 115 may also use other criteria or combinations of these criteria to determine if respective commands from computers 140 and 150 are mutually exclusive or in contrast, coherent.

In some embodiments, module 115 may analyze metadata associated with the respective commands from computers 140 and 150 to determine if the commands are mutually exclusive or coherent. Alternatively, coordinating processor 116 may process each command until the content of the command is sufficiently decoded for module 115 to compare the command to other commands to determine if there is a conflict.

Generally, coordinating server 110 may process each command, in turn, in the order in which it is received from computers 140 and 150. Each edit may trigger a "black-out" or "lock-out" period during which no other commands pertaining to the same document region or type of edit may be accepted or executed on the shared document. The lock-out period may be, for example, the approximate time it takes for module 115 to analyze the respective commands from computers 140 and 150 to determine if a preceding or subsequent command is mutually exclusive or coherent. Alternatively, the lock-out period may be the approximate time it takes for all computers 140 and 150 to execute the global command that triggered the lock-out period in their respective versions of the shared digital data. During the lock-out period, commands received from computers 140 and 150 pertaining to the same document sub-region or the same type of edit may be blocked, annulled or discarded. In one embodiment, the user computer that sent the command that triggered the black-out period may have exclusive rights to edit the shared document during this period since the changes, generated by the user, are already implemented in that user computer's local version of the document.

When computing module 115 determines that commands from computers 140 and 150 are mutually exclusive, module 115 may determine which of the mutually exclusive command(s) to execute and the order of execution in which to execute those commands.

In one embodiment, when respective commands from computers 140 and 150 are mutually exclusive, coordinating device 110 may "lock-in" to one computer 140, e.g., giving that computer exclusive permission to modify a portion or the entirety of the shared data and/or "locking-out" the other connected computer(s) 150, e.g., restricting the computer(s) from modifying the same portion or the entirety of the shared data. Coordinating device 110 may automatically lock-out computers from modifying a region or the entirety of a document or a layer or page thereof after a command is received associated with that region.

Computing module 115 may give one of computers 140 and 150 editing permissions, for example, based on the first computer from which an edit command is received or transmitted, the first computer to request to lock-in to have exclusive rights to edit a portion or the entire document, a priority level associated with each computer (e.g., a teacher computer may override or interfere with edits in a locked region of a student computer) a security or password permissions, or other criteria.

In one embodiment, a computer that is locked-out from editing a region of a shared digital data document cannot enter changes into its local version of the document. For example, a user on a locked-out computer may not select a cursor location or highlight text or image objects within the locked-out region. A digital data document protect operation may be executed on the locked region or the entire digital data document. Alternatively, a user may enter changes to his/her local version of the digital data but cannot enter the changes into the shared global version of the digital data. The user may make changes locally and then enter a submit button or designated key to submit the local changes to coordinating device 110, and, if the edits relate to a region from which the computer is locked-out, coordinating device 110 may reject or annul the command and, optionally, send a message to the locked-out computer, e.g., reading "Lock-out: your edit is not entered." If the user of the locked-out computer selects an "OK" button, the user indicates that the message is received, or if a predetermined time passes, the local edits that were not globally entered may be automatically deleted from the local version of the user document. In another embodiment, the user may manually delete the rejected edits.

In one embodiment, one user computer 140 may lock-out other user computer(s) 150. In some embodiments, only some users, e.g., with sufficient priority, password, or security permission, or an initiator of a group session, may lock-out other computers. Alternatively, any user computer may lock out any other user computer(s). User computer 140 may lock-out other user computer(s) or 150 automatically, e.g., by modifying the content of the shared digital data or manually, e.g., by entering a lock-in key to lock-in or a lock-out key to lock out other computers. In some embodiments, a user may select which user computer(s) 150 to lock out. In one embodiment, a user may lock out only other users with an equivalent and/or lower security or priority levels.

In some embodiments, a user may select or draw a lock-out region. For example, a user operating computer 140 may indicate a region of a shared digital data document for which they request temporary exclusive editing rights. The user may indicate the region on display 144 using input device 142, such as a keyboard for entering coordinates or a mouse for highlighting or drawing a region, such as a circle or rectangle. If the region indicated overlaps another region already being edited by another user, module 115 or another local command module may indicate this to the requesting user. The module may display the available portion of the requested region that the user may edit, the unavailable portion of the requested region, and/or the entire portion of the region already being edited by other user(s), e.g., highlighted in respective colors, on the requesting user's version of the shared document. In another embodiment, when a portion or the entirety of the requested region is already being edited, the requesting computer 140 may be placed in a queue and automatically informed, e.g., by a message reading "You may now enter your edits," and may be given exclusive access when the region becomes available for editing.

In one embodiment, the shared document may be iteratively or continuously highlighted or otherwise marked on each computer 140 and 150 throughout an editing session, e.g., in one color for regions which the present computer may modify and in one or more different color(s) for regions which the computer may not modify. In one example, each connected computer may have a color or symbol associated therewith such that when a team of users or co-workers edit a shared document, each user's edits are highlighted or otherwise marked by its associated color or symbol, so that it is clear which user(s) has generated which edits.

In one embodiment, coordinating device 110 may alternate or switch between locking-in computers 140 and 150, for example, to give each computer an equal or weighted proportion of the editing access to the shared digital data. This embodiment may be especially useful to provide an equal opportunity for each computer to edit the shared data, for example, when one computer has a better connection to coordinating device 110 than the other computer. Coordinating device 110 may switch between locking-in/out computers 140 and 150, for example, a predetermined lock-out time delay after a computer currently locked-in stops editing a paragraph, sub-region, or layer, or after the computer selects a 'finished editing' button or removes a 'lock-in' button. For example, after a computer that is locked-in stops editing a predetermined region of the shared digital data, e.g., a paragraph of a text document or sub-regions or layers of an image document, that computer may be locked out from editing the region.

In another embodiment, coordinating device 110 may switch the locked-in computer after each command, a predetermined number of commands, a predetermined number of computational cycles, or a predetermined time period, e.g., a number of beacon signals or clock cycles. In still another embodiment, coordinating device 110 may switch the locked-in computer when the executing computer ends a connected sequence of commands or changes the type of command. For example, a computer may be locked-in as long as the computer maintains a constant sequence of the same type of command(s). For example, a computer may fast-forward a movie for as long as desired, but once the computer switches the type of command, e.g., to play or rewind the movie, the computer gives up exclusive rights to modify the digital data and may be locked-out.

As coordinating device 110 generates a global sequence or ordered queue of commands, coordinating device 110 may transfer the commands to be implemented in the local versions of the shared documents stored on computers 140 and 150.

In one embodiment, coordinating device 110 may store the global sequence of commands in an execution buffer 117, e.g., in a queue in the order in which they are to be executed. The global sequence of commands may include commands received from computers 140 and/or 150 that are locked in or permitted to edit the content associated the command and may exclude commands from computers 140 and/or 150 that are locked out or prohibited from making such edits. Each computer 140 and 150 may have corresponding execution buffers 147 and 157, respectively, for executing commands on its local version of the shared digital data. Coordinating device 110 may transmit the data from execution buffer 117 to update buffers 147 and 157, for example, periodically, after every one or more predetermined number of new commands stored in buffer 117, or after a lock-out period for editing a region is ended. Processors 146 and 156 of may execute the commands stored in update buffers 147 and 157, e.g., in the order in which they are stored and/or queued, on the local versions of the shared digital data on each computer 140 and 150, respectively. According to such embodiments of the invention, in order to save bandwidth, only a list or queue of commands for modifying a shared digital data document is transmitted from coordinating device 110 to computer 140 and 150, and not the digital data itself, which typically requires a great deal more memory and computational power to transport than do the commands alone.

In contrast, in an alternative embodiment, coordinating device 110 may modify or update the actual shared digital data stored on a central version in coordinating device 110 and then send a copy of the modified portion of the digital data document or the entire digital data document to each of computers 140 and 150 in order to replace the latest version stored thereon.

Although computers 140 and 150 may be restricted from entering certain changes globally, in some embodiments of the invention, a user may enter any changes to his/her local version of the shared digital data on each computer 140 and 150. For example, a user may enter a change locally on each computer 140 and 150 regardless of whether or not he/she is locked-in, locked-out or permitted or restricted from making that change globally in coordinating device 110. After entering the changes locally, the user may enter a submit button or designated key to submit the local changes to coordinating device 110. The commands may be accepted or rejected and merged into a global sequence of commands, as described herein.

In one embodiment, the updated global sequence of command(s) may be sent to all connected computers. Alternatively, in another embodiment, the updated command may be sent only to the computer(s) which did not originally generate the command(s) since these commands are already implemented on the computers by which they are generated. In the latter embodiment, to generate the same version of the shared document on each computer 140 and 150, coordinating device 110 may transmit a different sequence of command(s) to each computer 140 and 150, which may include all cumulative changes made to the shared digital data but may exclude the commands generated by the individual computer.

In one embodiment, when a user on computer 140 enters one or more edit(s) into a document, the edits may be modified in real time on all shared versions of the digital data displayed on all other computer(s) 150. The edits are simultaneously or thereafter transmitted to coordinating device 110 where they may be accepted or deleted as described herein. In another embodiment, the edits made locally on each computer 140 are entered on other computer(s) 150 only after coordinating device 110 accepts the changes and implements them in the global command chain.

In one embodiment, global edits from each computer 140 or 150, which are accepted from coordinating device 110, may initially be entered in other computer(s) as marked or "tracked" changes. The edits may be marked or highlighted with a symbol or color indicating that they are generated by another user or indicating the individual user or group of users by which they are generated. The edits may be integrated and finally entered into the shared digital data, e.g., as plain text, only when all members of the shared editing team accept the edits in their respective versions of the document. Although the shared documents on each computer 140 or 150 may differ by markings, highlighting or other labels providing information relating to the shared environment, the actual content of the shared documents, e.g., text, images, audio, video frames, may be fully uniform, and edits of pre-existing and/or new content may be duplicated throughout the editing sessions on all versions of the shared documents on each member computer 140 or 150.

In one embodiment when multiple computers 140 and 150 enter multiple conflicting edits, the users may manually select which edit to implement and which to reject, for example, instead of or in addition to such automatic determination by computing module 115. For example, the multiple conflicting edits may be presented, e.g., in the footer, margins, tabs or pop-up notes of the shared document, on computers 140 and 150 and each respective user may select, e.g., click on, one or more preferred edit(s). The user's selections may be transmitted to coordinating sever 110 wherein computing module 115 may implement the preferred edit(s) into the sequence of global commands in buffer 117. Computing module 115 may implement the command(s) that have the greatest number of picks or the greatest cumulative value based on the number of picks weighted by the priority of the computer(s) by which the edit was picked.

In one embodiment, a user may modify a document off-line and then enter the changes in an on-line session already in progress or ended. The user may upload his/her locally modified document to coordinating device 110. The uploaded document may be converted to a string of commands for modifying the shared document. Many of the commands or modifications from the uploaded document may no longer be relevant since the shared digital data is continually changing within the on-line session. Only those commands that still relate to the latest version of the shared data and that do not conflict with other pending commands may be executed. Coordinating device 110 may generate a list or indication of each user's commands that are accepted and integrated into the document and/or a list or indication of each user's commands that have been rejected. In one embodiment, accepted and rejected changes may be indicated in the margins of the shared document version of the user that requested those changes. Accepted changes may be indicated, for example, by a font color or underlining and rejected changes may be indicated, for example, by a different font color, by striking-through or double bracketed text.

In some embodiments, coordinating device 110 may have multiple modes of operation for coordinating computers 140 and 150. In some embodiments, a user computer, e.g., the initiator computer, may select one or more of the available modes for which coordinating device 110 may operate.

In one mode, coordinating device 110 may queue commands in the order in which they are received. When two or more commands are received simultaneously or within a lock-out period, coordinating device 110 may operate according to preselected criteria to prioritize the edits to select to execute, for example, the command from the computer with a higher priority, the command from a computer from which another command was most or least recently requested, the command from a computer from which a relatively greater or lesser number of commands were rejected, the command that causes a more or less significant change, or a randomly selected command, etc. For example, in one embodiment the "significance" of a change may be proportional to the number of characters or paragraphs in a text document or pixels or layers in an image document that are affected by the command. For example, in another embodiment, the "significance" of a change may relate to the type of change, each type being ordered in a predetermined hierarchy of significance.

In another mode, coordinating device 110 may alternate or switch between locking-in computers 140 and 150 and queuing commands generated thereby.

In another mode, some users may be given "on-line" access to modify a document interactively with other users in a real-time editing session, while other users may only be given "off-line" access to modify a document off-line and then enter the changes in an on-line session already in progress or a session that has ended. The off-line users may upload their modified documents or files, entering all their commands at once. In this mode, coordinating device 110 may generate a set or string of commands to be executed from each uploaded document. In one embodiment, the string of commands may be the combination of all commands from the uploaded document other than commands that conflict with commands in the on-line session. In another embodiment, for each set of conflicting commands, the string of commands may include the command that conflicts the least with the current version of the document or conflicts with the fewest number of other commands.

In another mode, global edits are initially entered in the shared digital data on each computer 140 or 150 as marked or "tracked" changes. The edits may be fully integrated into the shared digital data, e.g., visually as plain text or substantively as new document content, when they are accepted by one or more users.

In another mode, coordinating device 110 may synchronize, not only the content of the shared digital data, but the way in which the data is displayed. For example, when one computer 140 sends a command to zoom in or out or to scroll down a shared digital data document, coordinating device 110 may implement and transmit the command to execute the same display change in the shared digital data version on all other computer(s) 150.

Modes other than the following may be programmed into and used by coordinating device 110.

In some embodiments of the invention, coordinating device 110 may keep a record of which changes are associated with each computer 140 and 150. For example, coordinating device 110 may keep a log of the changes associated with each computer, may store a tally or a table of pointers to the respective commands for each computer, may save the commands for each computer separately, or may tag the commands themselves with a marker indicating the computer by which the commands were generated. In order to view the changes generated by each individual computer, in one embodiment, a user may view the log of commands. In another embodiment, a color code may be assigned to each user and coordinating device 110 may display the shared document with each computer's changes highlighted in the color associated therewith. In yet another embodiment, coordinating device 110 may execute only the commands generated by one of computers 140 and 150, or by a subset or combination of computers 140 and 150. For example, coordinating device 110 may generate different versions of the shared digital data implementing edits from each individual or combination of editors in an editing group.

In one embodiment, each user computer 140 and 150 may operate an individual or personal version of the digital data including all the changes (accepted and rejected) that the operating user has generated as well as the global shared version of the digital data. The two versions may be viewed in adjacent windows on each user's display 144 and 154, for example, for comparison.

As used herein, editing may include altering the digital data in any manner, e.g., to change its content, e.g., delete, add or amend words or images or altering the way in which the data is displayed, formatted, or visualized to a user while leaving the digital data in tact, e.g., to switch from wide-screen to standard view, to zoom in or scroll down, or to fast-forward, rewind, increase or decrease speed, or to play a subset, e.g., every nth integer, of the frames in a movie.

Although embodiments of the invention describe a remote sever (e.g., coordinating device 110 of FIG. 1) that remotely controls commands from a plurality of computers (e.g., computers 140 and 150 of FIG. 1) executed on a shared document, it may be appreciated by persons skilled in the art that such capabilities may be implemented in one or more local computers. For example, in reference to FIG. 1, computer(s) 140 and/or 150 may include computing module 115 to queue a set of global commands and may use buffers 147 and 157, respectively, to store the queued commands. For example, the initiator computer, which initiates a shared document editing session, may coordinate commands entered from itself and other computer(s).

Figure 2:
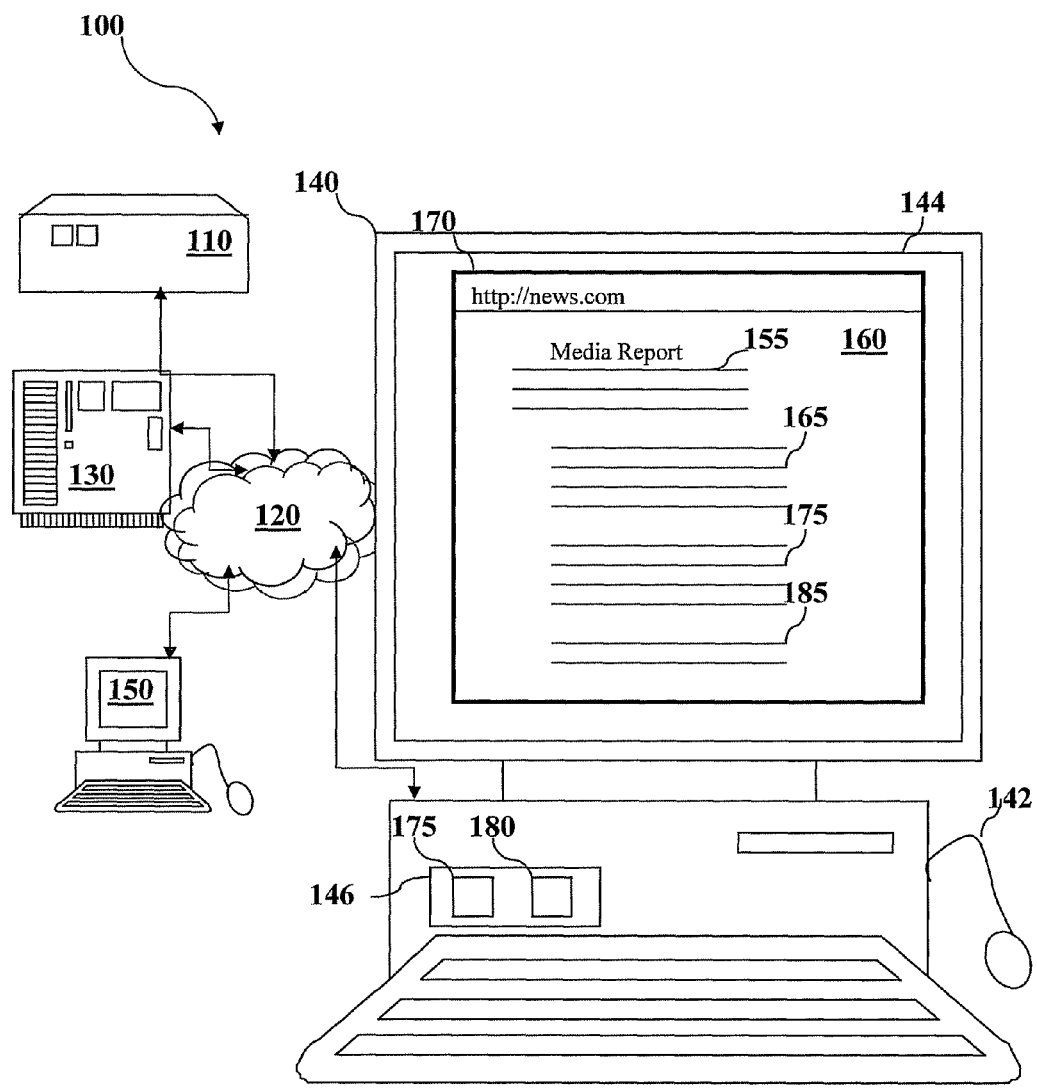
FIG. 2 is a schematic illustration of a digital data sharing application operated by the system of FIG. 1 according to an embodiment of the present invention.

Reference is made to FIG. 2, which is a schematic illustration of a digital data sharing display operated by the system of FIG. 1 according to an embodiment of the present invention.

User computer 140 may operate processor(s) 146 to load a digital data sharing display 160. In a web site implementation, data sharing display 160 may be a web page viewed with a web browser 170 from digital data server 130, such as a web host, e.g., provided over network 120. In a peer to peer implementation, data sharing display 160 may be provided by a data sharing application installed on one or all connected computers 140 and 150.

Processor(s) 146 and 156 may operate respective data sharing displays 160 on each user computer 140 and 150. Processor(s) 146 and 156 may invoke code 175 to retrieve content of shared digital data 155 (e.g., from digital data server 130) and code 180 to implement display 160 and retrieve a set of global commands (e.g., from buffer 117 in coordinating server 110) to be globally executed on shared digital data 155.

Code 175 may provide shared digital data 155 by way of standard or specific-purpose display software, such as a text editor for text documents, a photo editor for image documents, and/or a media player for video files.

Code 180 may execute a set of global commands on the shared digital data 155 in unison for synchronizing edits among connected computer 140 and 150. When coordinating device 110 is a remote device separate from computer 140 and 150, code 180 may be relatively simple and may be used, for example, only to transmit edit requests to coordinating device 110 and to receive the global edits from coordinating device 110 and implement them to modify shared digital data 155. However, when computer 140 and/or other computer(s) 150 coordinate edits in a peer to peer implementation, the computer(s) themselves are the coordinating device(s) 110. In this embodiment, code 180 stored on coordinating computer(s) 140 and/or 150 may include complex logic for timing, buffering, determining which commands to execute and which to annul, the order of the commands, similarities and differences between commands and data content, such as, if respective commands are coherent or mutually exclusive, and/or other logic described in reference to computing module 115 of FIG. 1. Code 175 and code 180 may be loaded and stored in memory unit(s) 148 or 158 of computers 140 and 150, respectively, for example, at least temporarily while each computer 140 and 150 is logged-in to an editing session.

Coordinating device 110 may receive a request from user computers 140 and 150 to edit shared content to be displayed using data sharing display 160. In addition to the editing information, the requests may include parameters or information, such as the number of type of edit requested, a user priority level or code, an IP address of the user viewing the page, a history log or information about the user's past edits, descriptive information that describes the content of shared digital data 155 to which the edit pertain or metadata associated therewith, a user identification code, a security code, the URL or address of the web page or peer to peer environment, and/or actual content from the shared digital data 155 to which the edit pertain. Coordinating device 110 may use such data, e.g., in addition to or instead of the commands themselves, to determine which commands to globally execute, in what order and with what priority. Other information may be used to decide which edits to implement globally on computers 140 and 150.

Given requests from computers 140 and 150 for editing shared digital data 155, coordinating device 110 may generate a set of global commands to be implemented uniformly in all versions of shared digital data 155 on all user computers 140 and 150. Processors 146 and 156 may, for example, retrieve one or more global commands(s) from buffer 117 and may store the commands(s) locally in buffers 147 and 157. Processors 146 and 156 of may execute the commands stored in execution buffers 147 and 157 on the local versions of the shared digital data on each computer 140 and 150, respectively.

In one embodiment, the retrieved commands(s) may include all cumulative commands to be executed on the shared document generated by all connected computers 140 and 150. In another embodiment, when commands generated by each computer 140 or 150 are already entered locally before they are globally approved by coordinating device 110, the set of commands(s) retrieved by each computer may exclude the commands generated by the computer itself. When all cumulative commands are received, code 180 on each computer may include additional functionality to delete or filter the commands generated by the individual computer.

In an exemplary embodiment related primarily to the operation of computer 140 (an equivalent description may be used relating to computer 150), computer 140 may locally modify shared digital data 155 in order to generate edited content 165 and 185, and computer 150 may locally modify shared digital data 155 in order to generate edited content 175. The corresponding commands may be sent to coordinating device 110. For example, coordinating device 110 may approve commands to generate edited content 165 and 175, but not edited content 185. Coordinating device 110 may store the set of commands corresponding to the approved edited content 165 and 175 in buffer 117 and may discard the commands corresponding to the prohibited edited content 185. Computer 140 may retrieve the set of commands from buffer 117. The commands sent from buffer 117 to computer 140 may include globally approved commands and may or may not include the commands generated by computer 140 itself. Computer 140 may store the retrieved commands locally in buffer 147. Processor 146 may execute the new retrieved commands or all commands stored in buffer 147 to update the shared digital data 155. Accordingly, processor 146 may delete prohibited edited content 185, leave as is or finally integrate approved edited content 165, and add approved edited content 175 generated by other computer(s) 150. In some embodiments, each set of edits may be labeled, color-coded, or otherwise marked to indicate whether or not the edits are finally integrated into all shared versions of shared digital data 155, if the edits are pending approval, if the edits are approved or rejected, and/or if the edits are generated by the present computer 140 or by another computer 150.

Figure 3:
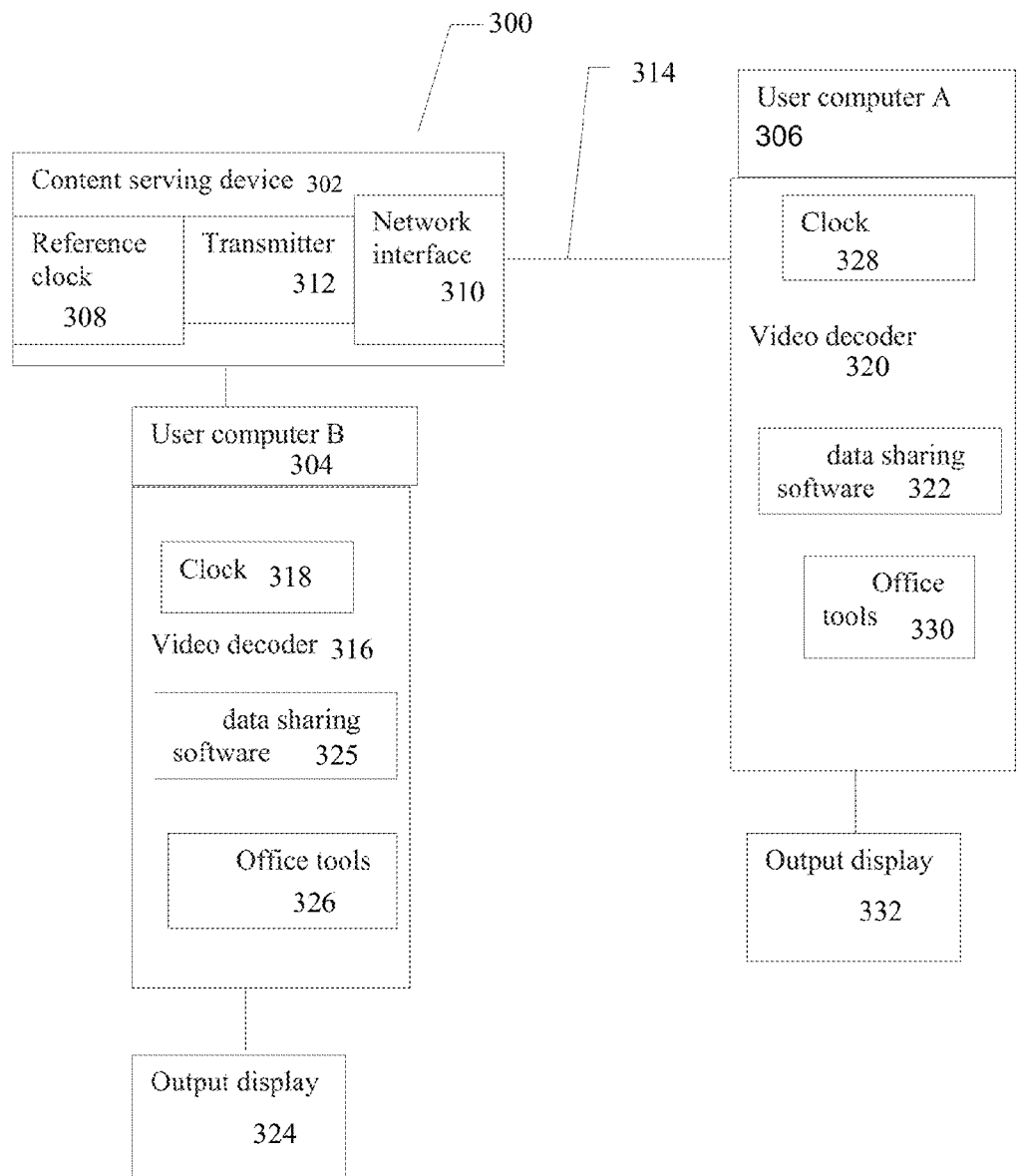
FIG. 3 is a schematic illustration of an example of the system of FIG. 1 used for sharing video data according to an embodiment of the present invention.

Reference is made to FIG. 3, which is a schematic illustration of an example of the system of FIG. 1 used for sharing video data according to an embodiment of the present invention. As shown, a system 300 may include a content serving device 302, such as a server, for example, digital data server 130 of FIGS. 1 and 2. Content serving device 302 may provide video/audio data to be streamed through a network 314. Content serving device 302 may also provide text, audio, image or multi-media single or multiple page documents via network 314. Content serving device 302 may belong to a content service provider. Network 314 may be any type of network as described herein, for example, network 120 of FIGS. 1 and 2, such as, the Internet.

Content serving device 302 may include a transmitter 312 for transmitting video data, which may (preferably) be in an encoded format. Transmitter 312 may perform any necessary processes for transmitting video data over network 314, for example by preparing the video data for transmission according to the video over IP standard. Transmitter 312 may transmit the video data through a network interface 310. Transmitter 312 may transmit the video data according to a standard for transmission of video data over network 314. Non-limiting examples of such standards include H.323, Real-time Transport Protocol (RTP), Real-Time Streaming Protocol (RTSP), and Session Initiation Protocol (SIP), which is preferably used for video conferencing. RTP may optionally be used in combination with H.323 and/or SIP. Audio data may be transmitted according to an appropriate protocol. Transfer of multipage documents may be performed according to a standard for transmission of such data including but not limited to hypertext transfer protocol (HTTP) standard or secure HTTP (HTTPS).

Timing of such video transmission may be controlled by a reference clock 308, which may be implemented as any type of real time mechanism as is known in the art, and may also be implemented as hardware, software or firmware, as is known in the art.

A plurality of user computers 304 and 306 may be connected via network 314 as shown, labeled as "user computer A" and "user computer B," respectively. Of course, any number of user computers may optionally be connected via network 314. Computers 304 and 306 may be operated according to embodiments of the invention, as described above in reference to computers 140 and 150 of FIGS. 1 and 2.

Each user computer 304 and 306 may include a video decoder 316 and 320, respectively. Video decoders 316 and 320 may receive the transmitted video data and prepares the data for being viewed on output displays 324 and 332, respectively. Video decoders 316 and 320 may be implemented as any type of media application as is known in the art, for example including iTunes® software for media file management and playback produced by Apple Computer, Inc., and/or as the Windows® media player (Microsoft Inc).

Timing of the operation of video decoders 316 and 320, and hence of the display of the video data, may be controlled by clocks 318 and 328, respectively, which may optionally be implemented as any type of real time mechanism as is known in the art, and may also be implemented as hardware, software or firmware, as is known in the art. Clocks 318 and 328 may be synchronized with reference clock 308 at video serving device 302, for example, using Network Time Protocol (NTP).

According to an exemplary embodiment of the present invention, user computer 304 may be, in this example, a session initiator. User computer 304 may send a request over network 314 to content serving device 302 to initiate synchronized playback. User computer 306 may receive the request directly from user computer 304, or alternatively may receive the request from content serving device 302. After session initiation, user computer 304 may delegate the ability to control the session to user computer 306. Clocks 318 and 328 and reference clock 308 may be synchronized, e.g., as described above.

Once user computer 304 and 306 have control over the session, both computers may control the playback of video data synchronized on output displays 324 and 332. For the purpose of this example, the shared content is video content. Content serving device 302 may start streaming the video data to both user computers 304 and 306. Optionally and preferably, both video decoders 316 and 320 at user computers 304 and 306, respectively, buffer the video data, for example, to prevent network "jitters" and also to more easily enable synchronization. The video data may be displayed at output displays 324 and 332 of user computers 304 and 306, respectively.

User computers 304 and 306 may include video sharing software 325 and 322, respectively. If video sharing software 325 at user computer 304 receives a command to alter the flow of video data, for example, through activation of the "stop", "pause", "rewind" and/or "fast forward" functions, a corresponding command may be sent to video sharing software 322 at user computer 306. Similarly, if video sharing software 322 at user computer 306 receives a command to alter the flow of video data, for example, through activation of the "stop", "pause", "rewind" and/or "fast forward" functions, a corresponding command may be sent to video sharing software 325 at user computer 304. Video decoders 316 and 320 at user computers 304 and 306 may then execute the corresponding command in order for the display of video data at user computers 304 and 306 to remain synchronized. For example, if video decoder 316 or 320 at one user computer executes a command to "stop" playing back the video data, then the video decoder 320 or 316, respectively, at the other computer likewise stops playing back the same or duplicate video data. The command may be sent directly from video decoder 316 or 320 at user computer 304 or 306 to video decoder 320 or 316 at user computer 306 or 304, respectively, for example, using a peer to peer protocol. Alternatively, the commands may be transmitted through content serving device 302. Video data may be sufficiently buffered to support commands such as "rewind" and "fast forward".

According to some embodiments, both user computers 304 and 306 may send commands to each other for controlling each others respective video decoders 316 and 320.

It should be understood that only two user computers are described in FIG. 3 for the purpose of illustration only and that the system and method described herein is capable of handling more user computers.

In the description above, the computer that controls the session may send commands substantially simultaneously to all the other computers. It should be noted that the video data described herein is used as an example only and when multipage, multi-media, or text data is used, user computers 304 and 306 may include office tools 326 and 330 to assist with performing one or more coordinated or synchronized editing commands (for example, to move to a particular page or other unit of data, re-write text, or re-format the documents). Preferably, each session may include displaying a plurality of units of digital content, such as a plurality of video clips, images, text objects, songs and the like, and/or a combination thereof, without requiring the session to be restarted.

Synchronizing video data in shared moving image streams (e.g., described in reference to FIG. 3) may be implemented according to embodiments described in reference to coordinating edits in shared digital data (e.g., described in reference to FIGS. 1 and 2), for example, where editing includes modifying the play rate of video data.

Figure 4:
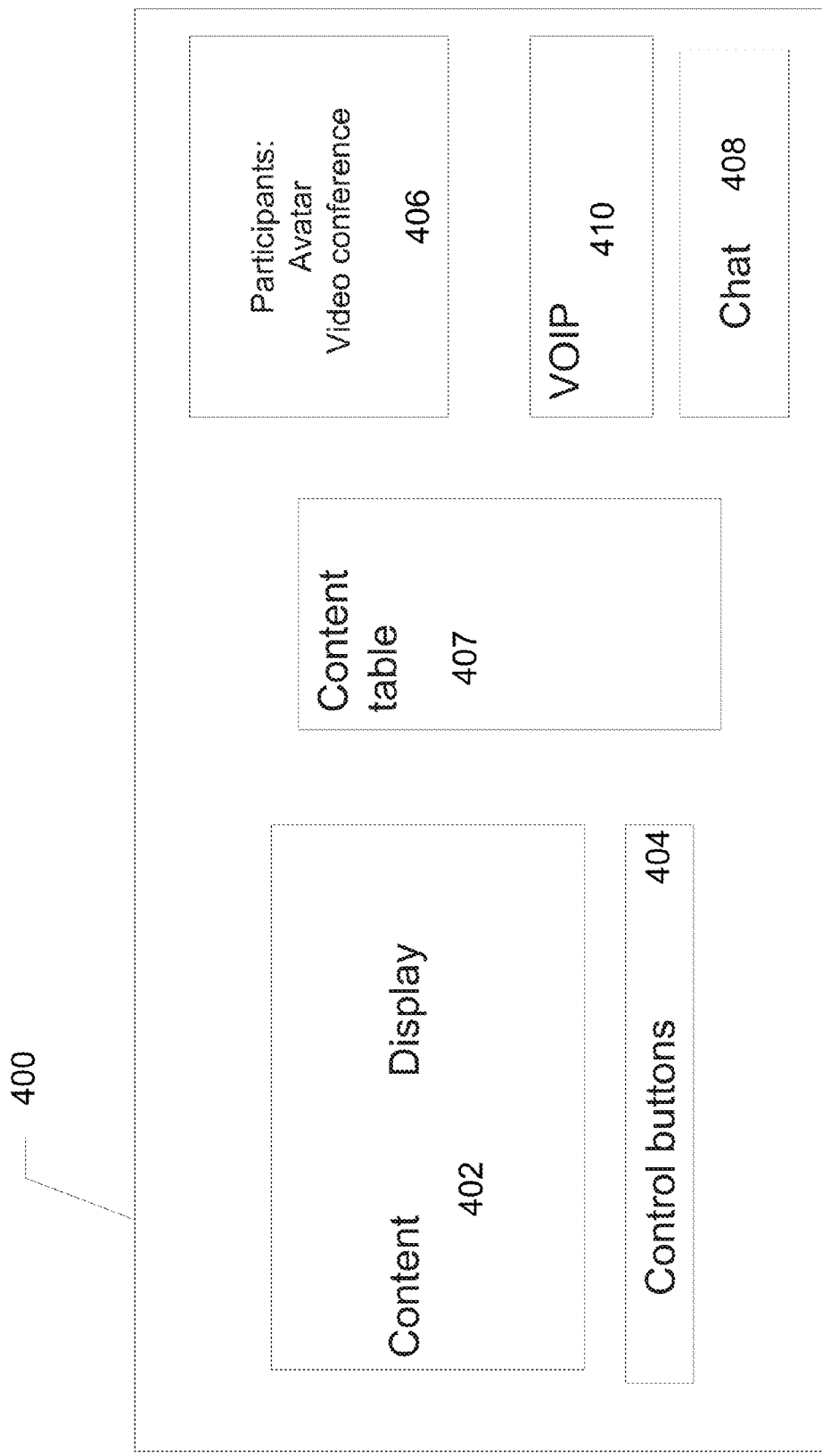
FIG. 4 is a schematic illustration of a digital data sharing software application display according to an embodiment of the present invention.

Reference is made to FIG. 4, which is a schematic illustration of a digital data sharing display 400 according to an embodiment of the present invention. Display 400 may be any type of display as described herein, including, for example, display 160 of FIG. 1. Display 400 may be implemented through a website as a web page viewed with a web browser, e.g., web browser 170 of FIG. 2. Display 400 may also be implemented as a window, using one of the existing operating systems such as Microsoft® windows. Display 400 may include a content display 402 for displaying the shared digital data (e.g., shared digital data 155 described in reference to FIG. 2, such as video and/or audio data described in reference to FIG. 3). When the shared digital data includes audio data, the "display" may include being played through loudspeakers or other audio equipment, for example.

Display 400 may include one or more control buttons 404, for operating the control commands. When the content is audio or video, control buttons may include for example play, rewind, forward and stop. When the content is a multipage document, control buttons may be, for example, start, to start displaying the document, next for going to the next page, previous for going to the previous page and go-to for jumping to a specific page. Control commands may be sent over a peer to peer protocol although they may alternatively be sent through a central server. Control commands also include the commands for inviting other member for the sessions and for delegating control of the session to other member computers. Control buttons for delegating control of the session are preferably available only for the initiator of the session.

Display 400 may include a participant display 406, showing a visual display of one or more participants in the video sharing session and/or a corresponding avatar. If the former, the visual display may be used to confirm that all participants are still viewing the data, for example, and/or to provide body language feedback.

A chat module 408 and voice over IP module 510 may be optionally provided for enabling session users of the various computers showing the video data to communicate, for example to exchange information and/or opinions regarding the data to being displayed.

A content table 407 may be used for displaying all the shared content. This table can optionally display URLs of video, clips, documents and the like that are shared between the participant of the session. The URLs may be displayed as thumb nail images. Each participant authorized to control the session may choose one of the content and from this table ad start playing this content.

Figure 5:
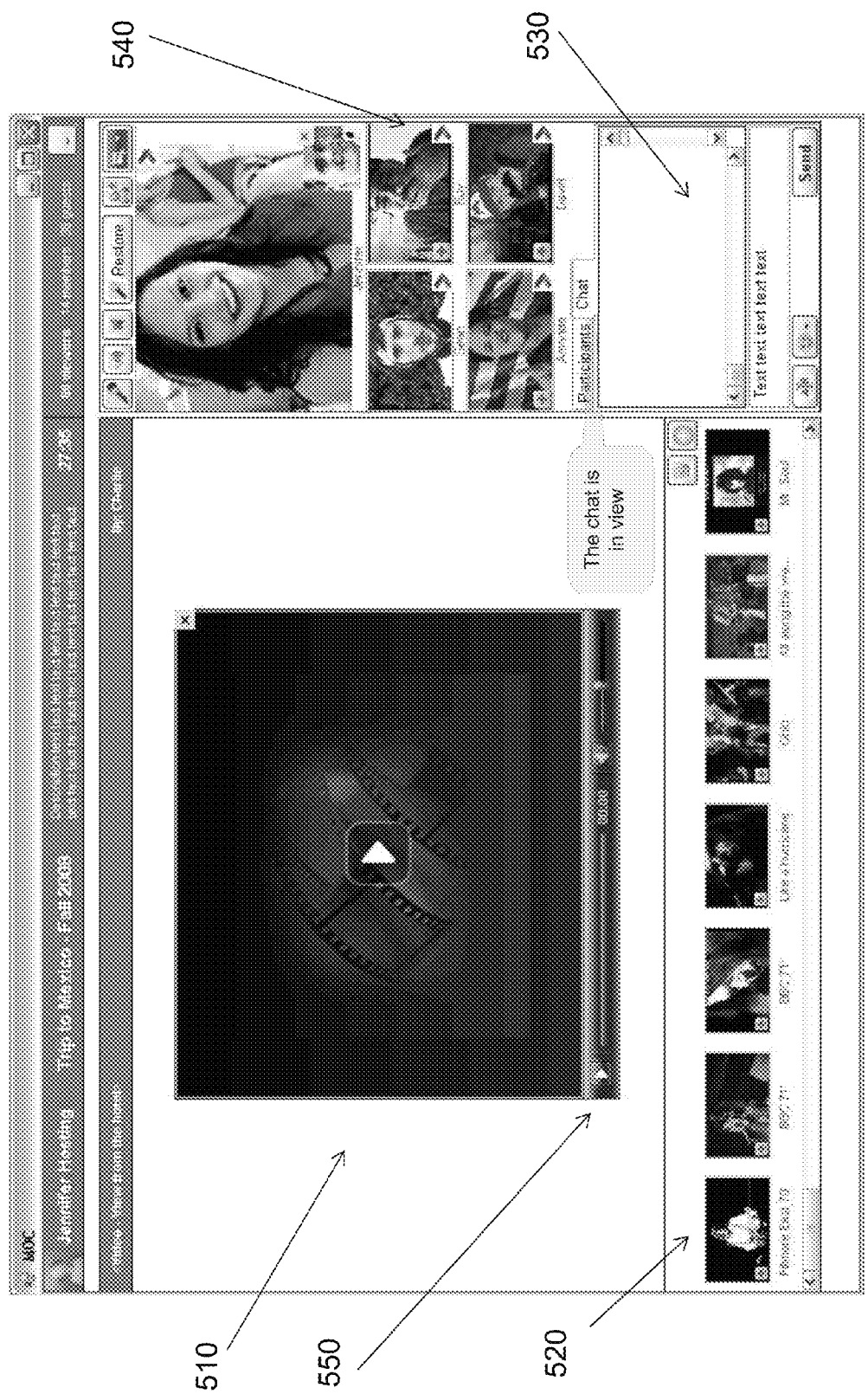
FIG. 5 is an example of a shared video displayed in the software sharing application display of FIG. 4 according to an embodiment of the present invention.

Reference is made to FIG. 5, which is an example of software sharing application display of FIG. 4 displaying shared video data according to an embodiment of the present invention. The playback of the shared video data in display 500 may be synchronized with the playback of the same or duplicate data on other connected computers. Synchronization may be implemented via a web site in which the computers may connect in a session. Alternatively, synchronization may be implemented using a peer to peer application installed on one or more computers in the session. Each session may handle digital media content, such as a movie, that is shared and synchronized by the members of the session.

As shown in FIG. 5, display 500 includes a content player display which may display the current running content 510, control buttons 550 for controlling the running content and a content table including a list of content data 520. Display 500 may also include a conferencing area with the display of the participants' avatars 540 (e.g., a computer representation of the user) and a chat area 530.

Commands executed using the interface of display 500 may be sent over a network, such as network 120 of FIGS. 1 and 2. The network may use a peer to peer protocol (although a protocol operating through a central server may also be used), and may be used for synchronizing the playing of digital content 510, for example for starting, stopping, or rewinding a movie which is currently shared by multiple media players.

Figure 6:
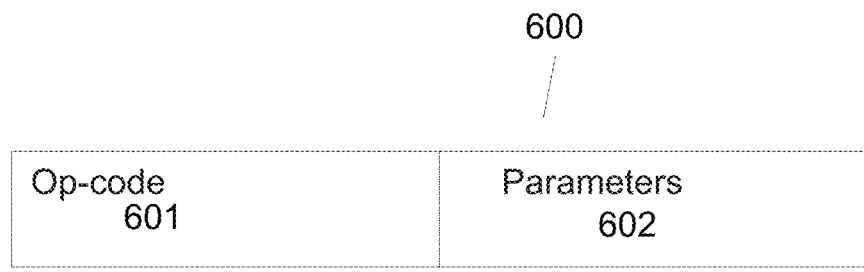
FIG. 6 is an exemplary diagram of a command structure according to an embodiment of the present invention.

Reference is made to FIG. 6, which is an exemplary diagram of a command structure according to an embodiment of the present invention.

A command structure 600 may include an op-code 601 and parameters 602. Op-code 601 may be the operation code of a command that has to be performed. Op-code 601 may be the operation code of commands, for example, to edit content of shared digital data (e.g., generating edited content 165, 175, and/or 185 of shared digital data 155 of FIG. 2), the formatting of the shared digital data, to edit the content display of to data (e.g., to scroll up or down, zoom in or out, play movie, rewind movie, forward movie, show photo, next photo, previous photo, show document, next page, previous page, go to page number and the like). Parameters 602 may include, for example, a URL of the shared memory location of the shared digital data content, a frame number in which a movie should be stopped or to rewind the movie (when the content is a movie), the page number (when the content is a document), and the like. Command structure 600 may optionally be a string or any other message structure, preferably according to the protocol used to transmit the command.

Figure 7:
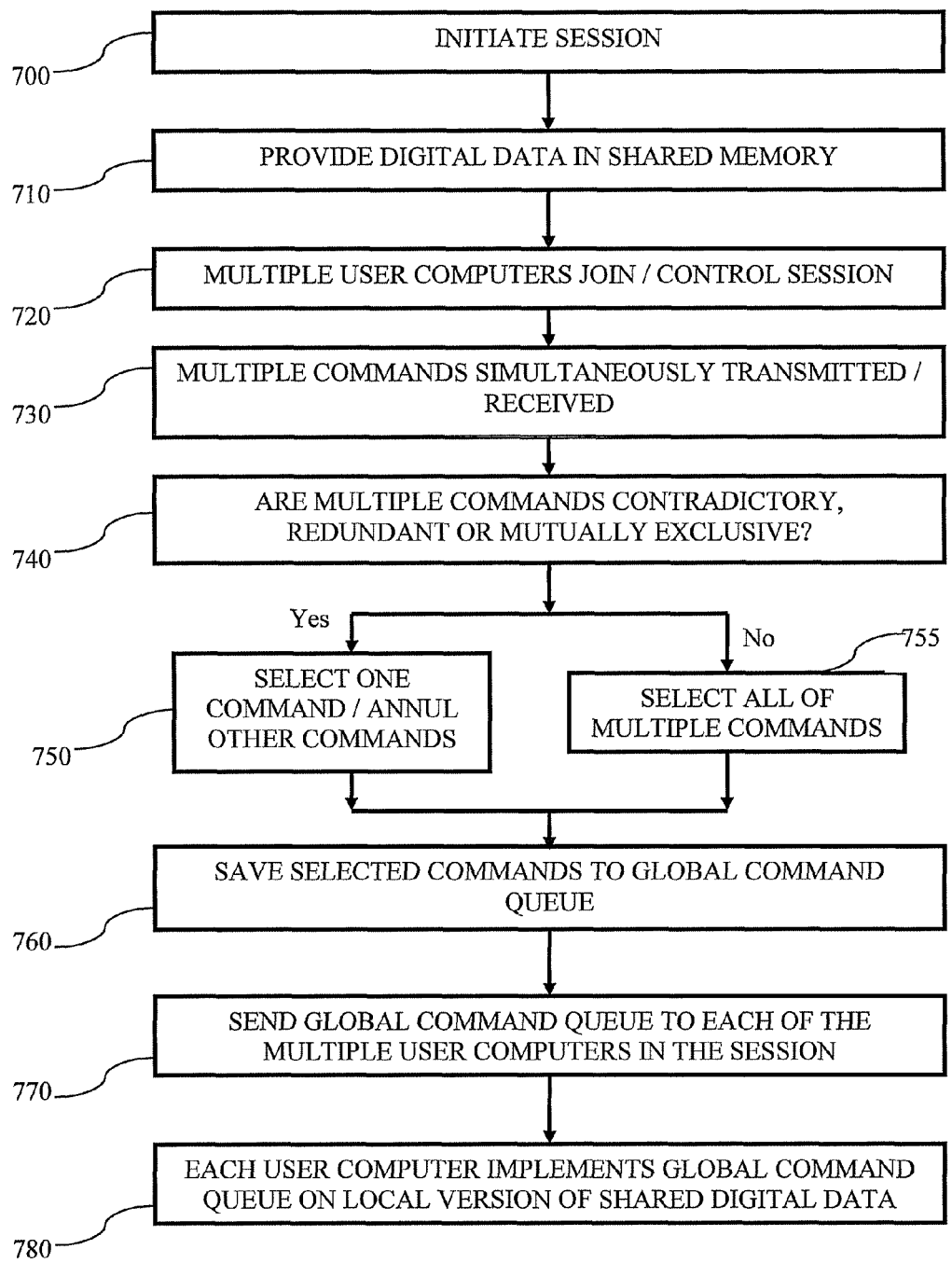
FIG. 7 is a flowchart of a method for controlling shared digital data over a plurality of independently operated computers according to an embodiment of the present invention.

Reference is made to FIG. 7, which is a flowchart of a method for controlling shared digital data over a plurality of independently operated user computers according to an embodiment of the present invention.

According to one embodiment of the invention, one user computer may initiate a session by inviting other computers to join, for example, to edit a document or to modify the playback rate a movie. In one embodiment, the initiator computer may delegate control to other user computers to edit the shared digital data. In other embodiments, control to edit the shared digital data may automatically be shared by all the participants of the session.

In operation 700, a first user computer A may initiate or enter a session for sharing digital data. The session may be supported by a web site over a network, such as the internet or, alternatively, by one of the session member computers using a peer to peer connection.

In operation 710, user computer A may provide or access digital content in a shared memory location (e.g., such as digital data server 130 of FIGS. 1 and 2 or content table 407 in FIG. 4). Storing the digital data in the shared memory location may enable the digital data to be shared by all the participants of the session.

In operation 720, multiple, independently operated user computers B and/or C may join the session. User computers B and/or C may join the session by accepting an invitation from A. The invitation may be sent via a peer to peer protocol. During the session any of the participants may invite other members to participate. In this scenario user computer B may invite user computer D to participate in the session. User computer D may accept the invitation to join the session.

User computer A may permit one or more other member computers to control the session. In one example, user computer A may start playing a movie and may delegate control over the movie to user computers B and D, for example, by using control commands (e.g., via control buttons 404 of FIG. 4). In another example, user computer A may start editing a digital data document and may delegate control over the document to user computers B and D. As a result of the play or edit command, data sharing software in the computers of all the participants of the session may start downloading from the shared memory location of content serving device. While the movie is played or while the data document is being edited, user computer C may invite user computer E to participate in the session. Since the control commands of the data sharing software may refer each computer to the current shared frame, user computer E may start watching the movie from the current played frame or may participate in the editing at the current state of the data document.

In the movie example, user computer A may then stop the movie and all user computers may discuss the scene. Discussion may be implemented via chat, video conferencing, voice over IP, or any other method for implementing a discussion over the network (e.g., using chat module 408 of FIG. 4). When discussion is finished, user computer D, which also has the ability to control the play rate of the movie, may start playing the movie again. When movie ends, user computer B may place a document in the shared area and start showing the document to the other user computers. During the session some participating computers may leave the session, while others may join.

In operation 730, during the session, multiple commands are transmitted by two or more of the multiple user computers A, B, C, D, and/or E and/or received by the coordinating device simultaneously or within a designated time interval. The time interval may be, for example, the estimated or approximate time it takes a coordinating device to analyze commands from the multiple computers to determine if the commands are contradictory, redundant or mutually exclusive (in operation 740) or alternatively, the estimated or approximate time from transmitting and/or receiving the commands (in operation 730) that it takes for all the computers in the session to execute at least one or more of the commands (in operation 780).

In operation 740, a coordinating device may determine if the respective commands transmitted by the two or more user computers trigger edits or operations that modify the shared digital data in a manner that is contradictory, redundant or mutually exclusive. If not, a process may proceed to operation 755. If yes, a process may proceed to operation 750.

In operation 750, the coordinating device may select one of the respective commands to execute and may annul or delete the other command(s) to prevent the execution of conflicting or interfering edits or operations.

In operation 755, the coordinating device may select all of the multiple commands to be executed since there is no conflict or interference between the multiple commands.

In operation 760, the coordinating device may save or incorporate the selected command(s) (from operation 750 or operation 755) into a global command queue.

In operation 770, the coordinating device may send or transfer the global command queue to each of the multiple user computers in the session.

In operation 780, each of those multiple user computers may implement the global command queue on their local version of shared digital data.

Other operations of sequences of operations may be used.

While the invention has been described with respect to a limited number of embodiments, it will be appreciated that many variations, modifications and other applications of the invention may be made.

What is claimed is:

1. A method for coordinating edits of shared digital data by multiple independently operated user computers, the method comprising:

In a coordinating device:
    receiving commands to edit the shared digital data from the multiple independently operated user computers,
    determining that two or more of the commands from respective ones of the multiple independently operated user computers are mutually exclusive when the two or more of the commands modify content of the shared digital data in a contradictory manner;
    incorporating one of the two or more mutually exclusive commands into a global command queue and annulling the other(s) of the two or more mutually exclusive commands; and
    transmitting the global command queue and not the shared digital data to all of the multiple independently operated user computers so that the two or more of the incorporated commands are to be executed locally on a version of the shared digital data stored on each of the multiple independently operated user computers, wherein said global command queue is transmitted to each of said multiple independently operated user computers for said incorporated commands to be executed locally only after said incorporating step.

2. The method of claim 1, wherein a command received from one of the multiple independently operated user computers triggers the coordinating device to restrict commands from the other multiple independently operated user computers.

3. The method of claim 2, comprising, in the coordinating device, annulling commands from the other multiple independently operated user computers that pertain to editing the same region of the shared digital data as the trigger command.

4. The method of claim 1, comprising, in the coordinating device, giving one of the multiple independently operated user computers temporary exclusive permission to edit a portion or the entirety of the shared digital data.

5. The method of claim 4, wherein the user computer with exclusive permission to edit the portion or entirety of the shared digital data is the first of the multiple independently operated user computers to transmit a command within a predetermined time period to edit the portion or the entirety of a document.

6. The method of claim 1, wherein the two or more of the commands are determined to be mutually exclusive when the two or more of the commands relate to editing of the same or overlapping portions of the shared digital data.

7. The method of claim 1, wherein the two or more of the commands are determined to be mutually exclusive when the two or more of the commands are transmitted or received simultaneously or within a predetermined time interval.

8. The method of claim 1, wherein each version of the shared digital data stored locally on each of the multiple independently operated user computers may be modified independently before implementing the global commands into the shared digital data.

9. The method of claim 1, wherein all of the multiple independently operated user computers have equal priority to control the shared digital data.

10. The method of claim 1, wherein the multiple independently operated user computers may have different priority for controlling the shared digital data.

11. The method of claim 1, wherein editing comprises modifying the content of the shared digital data.

12. The method of claim 1, wherein editing comprises modifying the display of the shared digital data.

13. A system for coordinating edits of shared digital data by multiple independently operated user computers, the system comprising a coordinating device comprising a memory and an operatively coupled processor to:
    receive commands to edit the shared digital data from the multiple independently operated user computers;
    determine that two or more of the commands from respective ones of the multiple independently operated user computers are mutually exclusive when the two or more of the commands modify content of the shared digital data in a contradictory manner;
    incorporate one of the two or more mutually exclusive commands into a global command queue and annul the other(s) of the two or more mutually exclusive commands; and
    transmit the global command queue and not the shared digital data to all of the multiple independently operated user computers so that the two or more of the incorporated commands are to be executed locally on a version of the shared digital data stored on each of the multiple independently operated user computers, wherein said global command queue is transmitted to each of said multiple independently operated user computers for said incorporated commands to be executed locally only after said incorporating step.

14. The system of claim 13 comprising a shared memory location storing the shared digital data accessible by the multiple independently operated user computers.

* * * * *